March 3, 1942.                O. F. RITZMANN                2,275,316
            APPARATUS FOR SENDING AND RECORDING TIME IMPULSES
                  Filed June 26, 1941        2 Sheets-Sheet 1
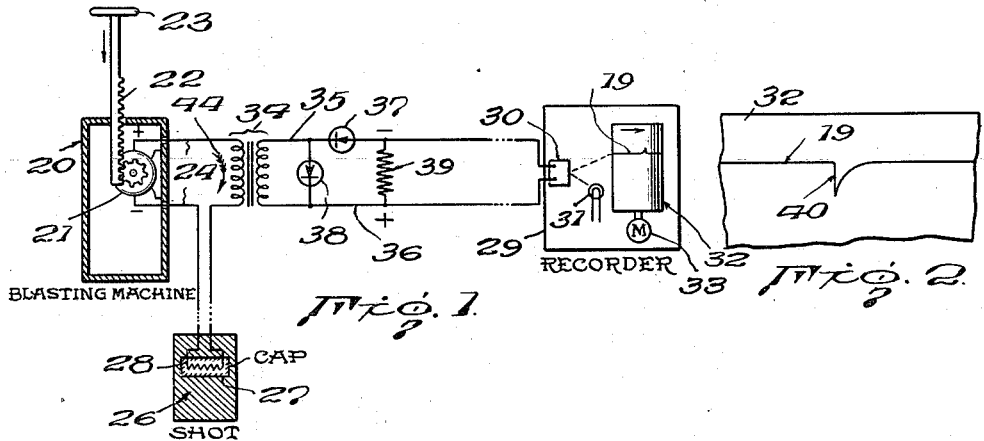
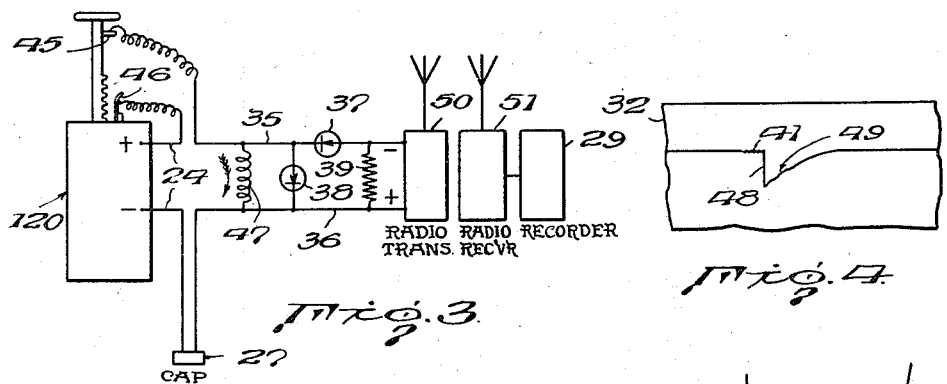
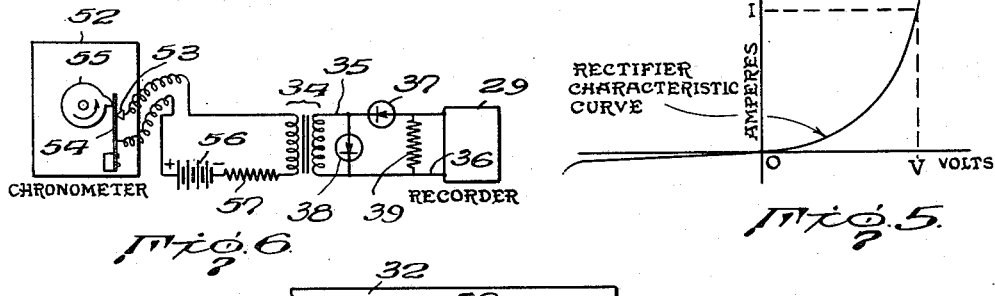
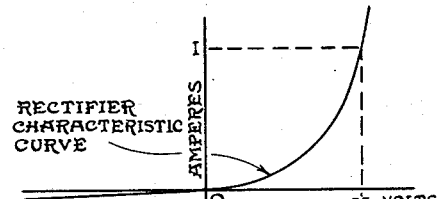
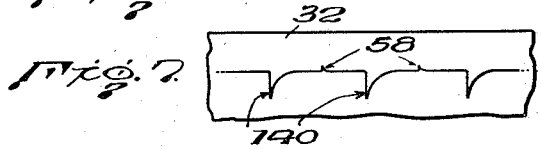
Inventor
O. F. Ritzmann,
By A. M. Houghton
his Attorney March 3, 1942.   O. F. RITZMANN   2,275,316
APPARATUS FOR SENDING AND RECORDING TIME IMPULSES
Filed June 26, 1941   2 Sheets-Sheet 2
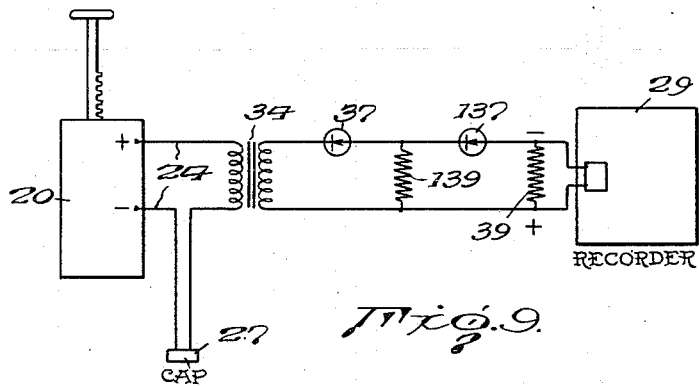
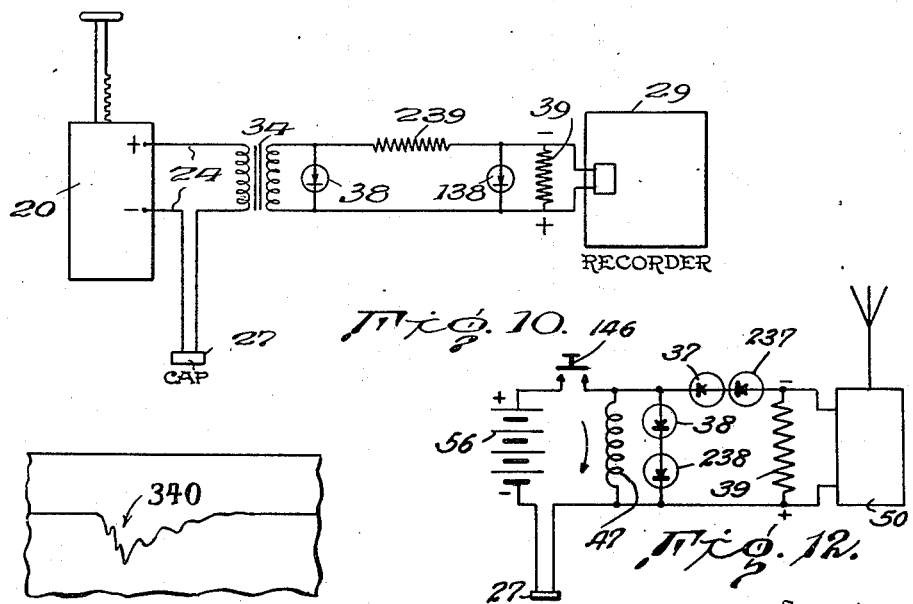
Fig. 11
PRIOR ART Patented Mar. 3, 1942

2,275,316

UNITED STATES PATENT OFFICE 2,275,316

APPARATUS FOR SENDING AND RECORDING TIME IMPULSES

Otto F. Ritzmann, Aspinwall, Pa., assignor to Gulf Research & Development Company, Pittsburgh, Pa., a corporation of Delaware Application June 26, 1941, Serial No. 399,923

4 Claims. (Cl. 234—36.5)

This invention relates to improvements in apparatus for sending and recording time impulses.

In seismograph prospecting, a charge of dynamite (the shot) is fired electrically at some point in the earth. The artificial seismic waves generated thereby in the earth are detected electrically at one or more points spaced from the shot and recorded photographically. For best results, it is desirable to indicate very accurately on the seismic wave record, the exact instant of time at which the shot explodes. In the ordinary system a blasting machine (a manually operated D. C. generator) is used to fire an electrical blasting cap embedded in the dynamite, and the cap is connected in circuit, directly or indirectly, with an electrical oscillograph recording device arranged to produce a mark on the seismic wave record. The circuit connecting the blasting machine, cap and oscillograph is normally open, while the blasting machine handle is being pushed down. Near the bottom of the stroke, a switch is closed, completing the circuit, whereby current builds up rapidly in the circuit. When the cap explodes the circuit is broken and the current drops to zero. The shot firing instant is read on the record as the point where the current begins to drop.

This simple system does not give as definite an indication of the exact instant of the explosion as is desired. The time indication on the record is not a sharp jerk, but instead shows a gradually rising portion, with several subsidiary ripples, quavers or wiggles, and a gradually falling portion, which likewise contains irregularities. It is difficult to tell just which part of the mark corresponds to the actual instant of explosion. Sometimes the highest amplitude part of the mark does not correspond to the instant of explosion. Short circuiting of the cap leads may give rise to serious spurious indications. To make matters worse, the character of the record varies with different makes and designs of caps, and even with different batches of caps of the same make.

Among the objects of the invention are the provision of an improved apparatus for transmitting and recording the exact instant of time at which a shot or other phenomenon takes place, in a definite and unambiguous manner; to provide such an apparatus including a circuit in which reversals of current in an impulse being recorded are prevented, so as to secure a simple and regular mark; and the provision of such circuits in combination with blasting machines in which the necessity for provision of a blasting machine switch is obviated.

These and other objects are achieved by the provision of apparatus including a coupling means in circuit with a source of energy and an interrupting means, so that on interrupting the circuit a current impulse is induced in the coupling means, an oscillographic recorder, and a network between the coupling means and the recorder having shunt and series branches and at least two half-wave rectifiers, each in a different branch of the network, and so connected as to allow transmission to the recorder of pulses of the polarity resulting from interruption of the circuit while obstructing transmission to the recorder of signals of opposite polarity. The net result is a perfectly clear and unidirectional impulse as recorded, despite the ragged character of the original impulse. In the embodiment wherein the source of energy is a blasting machine, the invention makes possible elimination of the customary switch at the blasting machine, if desired, with marked advantage.

In the accompanying drawings there are shown diagrammatically five examples of apparatus within the purview of the invention and schematic reproductions of typical time records obtained thereby. In the drawings, Fig. 1 is a diagram of a complete apparatus including the time impulse transmitting circuit and recorder, Fig. 2 is a reproduction of a portion of the timing record obtained with the apparatus of Fig. 1, Fig. 3 is a diagram of a modified form of the apparatus of Fig. 1, Fig. 4 is a reproduction of a portion of the timing record obtained with the apparatus of Fig. 3, Fig. 5 is a chart showing a typical rectifier characteristic curve for aid in understanding the invention, Fig. 6 is a diagram of the system of Fig. 1 as applied to chronography, Fig. 7 is a reproduction of a portion of the timing record obtained with the apparatus of Fig. 6, Fig. 8 is a chart showing the character of the time signals of the apparatus of Fig. 6 as transmitted by radio, Fig. 9 is a diagrammatic showing of a modification of the apparatus of Fig. 1, making use of a different network between the coupling means and the recorder, Fig. 10 is a similar showing of another modification, with a modified network between the coupling means and the recorder, Fig. 11 is a showing illustrative of typical blasting impulses as recorded in prior art systems, and Fig. 12 is a diagram of a modification of the apparatus of Fig. 3, employing a battery as a source of energy and employing a plurality of series and of shunt rectifiers.

Referring to the drawings and in particular to Fig. 1, a blasting machine 20 of known type is provided, comprising a D. C. generator 21 operable by a rack 22 having a handle 23. Upon pushing down the handle, a direct current is developed in leads 24 from the generator, which may have a peak voltage output of 200 to 300 volts at no load, and a maximum current output of 2 or 3 amperes. The machine is adapted to fire a shot, shown as comprising a charge of dynamite 26 in which is embedded an electric blasting cap 27 of explosive material and containing a heating resistor 28 for exploding the cap and hence the dynamite. At 29 is shown a conventional recorder, part of a seismograph (not shown), which includes an oscillograph element (a sensitive galvanometer) 30 arranged to reflect a focused beam of light from a lamp 31 on to the surface of a band of photographic sensitized paper 32 moved by a motor 33. Upon electrical energization of the oscillograph element a trace 19 is produced on the moving photographic paper which appears as a black mark when the paper is developed. A transformer 34 is arranged with its input in series with the cap 27 and the blasting machine. The primary of the transformer together with these elements completes a primary circuit. The output of the transformer is applied through a pair of leads 35 and 36 to the oscillograph element, forming a secondary circuit. Leads 35 and 36 in practice may take the form of a telephone line several hundred yards long. A rectifier 37 is arranged in lead 35, to permit flow of current in only one direction as shown, and a second rectifier 38 is connected in shunt across the transformer output as shown. A resistor 39 is shown connected in shunt across leads 35 and 36, to limit to a safe value the current applied to the sensitive oscillograph element.

The operation of the system is as follows: Upon pushing down handle 23 a current of progressively increasing magnitude is developed in the primary circuit comprising leads 24, the primary of transformer 34, and the cap. The direction of the current flow is indicated by arrow 44. However, no flow of current can take place through the oscillograph element 30 because of rectifier 37 which permits current flow only in the direction indicated and stops reverse flow. Accordingly, the trace 19 on record 22 remains a straight line. Rectifier 38 bypasses current developed in the transformer secondary and serves in effect to short circuit the oscillograph element. When a sufficient current is developed by the blasting machine to explode the cap, the cap fires, the shot explodes and the primary circuit is broken. Instantly the collapse of the magnetic field in transformer 34 induces in leads 35 and 36 a high voltage of reverse polarity. This voltage is not short-circuited by rectifier 38 and it is passed by rectifier 37. It appears across resistor 39 with the polarity indicated as shown and actuates oscillograph element 30. An abrupt jerk occurs as shown at 40 in Fig. 2, which shows a portion of record paper 32 to an enlarged scale. The induced current very quickly dies down and the trace returns to normal as shown in Fig. 2.

The time indication shown in Fig. 2 is practically an ideal record, as it not only corresponds very closely to the exact instant of initiation of the explosion, but also it is very definite and unambiguous in character. There are practically no tremblings or wiggles in the record because the rectifiers permit flow of current in only one direction. By way of comparison, Fig. 11 shows at 340 a typical shot moment impulse as recorded by conventional systems, without the improvement of the present invention.

If rectifier 37 were 100 per cent efficient, that is, if it passed zero current in the opposite direction from the current direction it is designed to transmit, there would be no point in providing shunt rectifier 38. But since rectifiers as at present known are not perfectly efficient, rectifier 38 is included as shown and described. If desired, a plurality of rectifiers can be used in series, at 37 or 38 or both, to secure more efficient unidirectional transmission. Such a modification is shown in Fig. 12, in which two series rectifiers 37 and 237, and two shunt rectifiers 38 and 238, are provided, in a secondary circuit otherwise like that of Fig. 3. The rectifiers are arranged in the secondary circuit as shown and described so that they need carry less current than that flowing in the primary circuit and also so that advantage is taken of their selective current amplitude characteristics as described in detail below.

The transformer 34 is advantageously a step-up transformer. A voltage step-up ratio of about 8:1 is especially advantageous. The stepped-up signal is easier to transmit long distances, and currents are lower in the secondary circuit. However, in lieu of a transformer a simple inductance coil can be employed.

Fig. 3 shows a modification of the apparatus of Fig. 1 which is adapted for use with switch type blasting machines. The blasting machine 120 is like that shown in Fig. 1 except for having switch contacts 45 and 46, which are adapted to close when the handle is pushed down almost, but not quite, to the end of its stroke. Switch 45, 46 is connected in series with one of the leads 24 as shown, so that the circuit through the cap is normally open and is not closed until the machine handle is almost all the way down. In Fig. 3 the transformer is dispensed with and a simple choke coil 47 is arranged in shunt across leads 35 and 36 to serve a similar function. Fig. 3 shows a radio transmitter 50 and receiver 51 interposed between the blasting machine and the recorder; an arrangement sometimes used in seismograph prospecting when the shot and the recorders are several miles apart. If desired, the connection can be direct as in Fig. 1.

In operation, as the machine handle is pushed down the whole circuit is dead until contactor 45 engages contactor 46. This applies the blasting machine output to the cap and explodes it. During the time current is flowing to the cap, the recorder is short circuited by rectifier 38 as described in connection with Fig. 1. When the cap explodes it breaks the circuit and a surge current of reversed polarity is developed in coil 47, which flows through rectifier 37 and the recorder oscillograph 30, making a mark on the record which appears as shown in Fig. 4 at 48. This record may have a few minor irregularities as indicated at 41 and 49, but these are of negligible importance. The explosion instant is definite and is very easy to read. The timing mark is uniform, despite such irregularities in the blasting machine-cap circuit as arcing, commutator ripple, short-circuiting of the cap leads after the explosion, etc. The transmitting circuit only transmits current flowing in one direction. Only the true break of the primary circuit is recorded.

On the whole I regard the system of Fig. 1 as the best embodiment, because it dispenses with the usual blasting machine switch. The switch has been a source of trouble because its contacts are apt to get dirty and corroded, and this, together with arcing at the switch contacts, sometimes produces spurious indications on the record. However, if it is desired to employ a switch, the system of Fig. 3 gives time records which are much superior to anything that can be obtained with the ordinary systems. In Fig. 3 the blasting machine can be replaced by a battery if desired, in the manner shown in Fig. 12, a switch 146 being provided as shown to close the cap circuit.

For rectifiers 37 and 38 I ordinarily employ copper oxide rectifiers, because of their simplicity, ruggedness, compactness and convenience, but other types of rectifiers can be employed if desired.

Fig. 5 shows the characteristics of rectifiers of the copper oxide type (which characteristics also apply to rectifiers of many other types) and illustrates how the results of the invention are achieved. Upon application of a relatively high voltage such as V to the rectifier in a forward direction, that is, in the polarity which the rectifier is adapted to pass, a relatively large current I is passed, and the resistance of the rectifier under these conditions may be only a few ohms. If, however, a small voltage is applied, in either direction, the current flowing through the rectifier is very small; the resistance of the rectifier to flow of small currents may be as much as hundreds or thousands of ohms depending on the magnitude of the current. In the reverse direction even large voltages meet resistance of a thousand ohms or more. The rectifier 37 is chosen in relation to the other circuit constants so that it will function on that part of the characteristic curve which does not allow the small current fluctuations to pass, but which does pass the large current surge due to shooting the cap. This accounts for the suppression of undulations in the records of Figs. 2 and 4. The rectifier is selective to amplitude as well as to polarity of electrical signals applied to it, in that it transmits high voltages very much more freely than low voltages. Full advantage is taken of this property as the rectifiers are connected into the secondary (high voltage) circuit.

The transformer, rectifiers and resistor are conveniently mounted in a suitable housing (not shown) attached to the blasting machine.

The rectifiers can be arranged in manner other than the shunt and series connection of Figs. 1 and 3, the essential being to have them connected, each in a different branch of an electrical network having shunt and series branches, in such manner as to allow transmission to the recorder of pulses of polarity resulting from interruption of the primary circuit while obstructing transmission to the recorder of signals of opposite polarity. Figs. 9 and 10 show optional circuits. In Fig. 9 the network between coupling means 34 and the recorder has resistive shunt branches 39, 139 and series branches on either side of resistor 139; in separate series branches are two rectifiers 37 and 137. In Fig. 10 rectifiers 38 and 138 are connected as two shunt branches of the network, the series branch including a series resistor 239.

The invention is applicable to other utilizations than recording the instant of firing of a dynamite charge. It is desirable in many arts to produce a sharp and unambiguous time record on a chart, etc.; a sharper impulse than can be secured merely by opening or closing switch contacts. Fig. 6 shows how the invention is applied to chronography, where it is desired to produce marks on a record at regular spaced intervals of time. A chronometer 52, which may be a clock for example, is arranged to close and open at regular intervals a switch comprising contactors 53 and 54, by means of a cam 55. The switch is connected in series with a battery 56, a resistor 57 and the primary of a transformer 34 in circuit with a recorder as in Fig. 1. Upon actuation of the chronometer a series of time marks is produced as shown at 140 in Fig. 7. The marks 140 correspond to the breaks (openings) of switch 53, 54. The makes (closings) of the switch are largely suppressed by the action of rectifiers 37 and 38, and appear only as very small jogs 58. The apparatus of Fig. 6 not only gives remarkably sharp time marks, but also, by suppressing the makes of the chronometer switch eliminates an annoying source of confusion. Fig. 8 shows how the time record may appear after transmission by radio. The sharp character of the impulses is largely preserved as indicated at 240.

What I claim is:

1. An apparatus for sending and recording clearly a current impulse of irregularly fluctuating character, comprising a circuit including an inductive coupling means and means for producing an abrupt change in current in said circuit whereby on such abrupt change a current impulse is induced in the coupling means, said impulse being subject to irregular fluctuations, an oscillographic impulse recorder arranged to receive and record the induced impulse, said recorder being constructed and arranged to record the characteristic wave form of impulses applied to it, an electrical network having shunt and series branches arranged to transmit pulses from the coupling means to the recorder and at least two half-wave rectifiers each in a different branch of said network and each connected to allow transmission to the recorder of pulses of the polarity resulting from the abrupt change in current in said circuit and to obstruct transmission to the recorder of signals of opposite polarity, whereby the impulse as recorded is of sharp unidirectional character.

2. An apparatus for sending and recording a current impulse of fluctuating character produced by the interruption of a blasting circuit, comprising in combination an inductive coupling means connected in a blasting circuit whereby on interrupting such circuit a current impulse is induced in the coupling means, a seismograph type oscillographic impulse recorder arranged to receive and record the induced impulse, said recorder being constructed and arranged to record the characteristic wave form of impulses applied to it, an electrical network having shunt and series branches arranged to transmit pulses from the coupling means to the recorder and at least two half-wave rectifiers each in a different branch of said network and each connected to allow transmission to the recorder of pulses of the polarity resulting from the interruption of the blasting circuit and to obstruct transmission to the recorder of signals of opposite polarity, whereby the impulse as recorded is of sharp unidirectional character.

3. An apparatus for sending and exhibiting a current impulse of irregular fluctuating character produced by the breaking of a blasting circuit, comprising in combination an inductive coupling means connected in a blasting circuit whereby on breaking of such circuit a current impulse is induced by the coupling means, impulse exhibiting means arranged to receive the induced impulse, a copper oxide type rectifier connected in the output side of the coupling means in series relation thereto so as to pass induced current in one direction only, of polarity resulting from breaking of said blasting circuit and to obstruct current of opposite direction, and a copper oxide type rectifier connected in shunt relation to the coupling means on the output side thereof in such manner as to by-pass current of polarity opposite to that resulting from breaking of the blasting circuit; whereby the impulse as exhibited is of sharp unidirectional character.

4. An apparatus for sending and recording a current impulse of irregular fluctuating character produced by the interruption of a blasting circuit, comprising in combination an inductive coupling means connected in a blasting circuit whereby on breaking such circuit a current impulse is induced in the coupling means, a seismograph type oscillographic impulse recorder arranged to receive the induced impulse, said recorder being constructed and arranged to record quantitatively impulses applied to it, a half-wave rectifier connected in the output side of the coupling means in series relation thereto, and a half-wave rectifier connected in shunt relation to the output side of the coupling means, said series rectifier being connected so as to pass induced current of polarity resulting from interruption of the blasting circuit and said shunt rectifier being connected so as to by-pass current of opposite polarity; whereby the blasting circuit interruption impulse as recorded is of sharp unidirectional character.

OTTO F. RITZMANN.